(12) United States Patent
Selker et al.

(10) Patent No.: US 9,557,437 B2
(45) Date of Patent: Jan. 31, 2017

(54) MONITORING MOVEMENT IN FLUID-CONTAINING ENVIRONMENT VIA VARIABLE HEATING

(71) Applicants: Frank Selker, Portland, OR (US); John S. Selker, Corvallis, OR (US)

(72) Inventors: Frank Selker, Portland, OR (US); John S. Selker, Corvallis, OR (US)

(73) Assignee: Selkermetrics, LLC, Portland, OR (US)

( * ) Notice: Subject to any disclaimer, the term of this patent is extended or adjusted under 35 U.S.C. 154(b) by 635 days.

(21) Appl. No.: 13/963,467

(22) Filed: Aug. 9, 2013

(65) Prior Publication Data

US 2014/0064329 A1  Mar. 6, 2014

Related U.S. Application Data

(60) Provisional application No. 61/694,524, filed on Aug. 29, 2012.

(51) Int. Cl.
*G01V 9/02* (2006.01)
*G01V 9/00* (2006.01)

(52) U.S. Cl.
CPC .............. *G01V 9/02* (2013.01); *G01V 9/005* (2013.01)

(58) Field of Classification Search
USPC .......................... 374/136; 73/152.12, 152.13
See application file for complete search history.

(56) References Cited

U.S. PATENT DOCUMENTS

| | | | | |
|---|---|---|---|---|
| 3,808,889 A | * | 5/1974 | Rawson | E21B 47/065 374/134 |
| 6,227,045 B1 | * | 5/2001 | Morse | E21B 47/1005 166/264 |
| 6,497,279 B1 | * | 12/2002 | Williams | E21B 36/04 166/250.01 |
| 7,717,172 B2 | * | 5/2010 | Sonne | E21B 49/081 166/264 |
| 7,731,421 B2 | * | 6/2010 | Hadley | E21B 36/04 374/131 |
| 8,630,816 B2 | * | 1/2014 | Park | G01F 23/22 166/250.01 |
| 2004/0252748 A1 | * | 12/2004 | Gleitman | E21B 47/06 374/130 |

\* cited by examiner

*Primary Examiner* — Lisa Caputo
*Assistant Examiner* — Nasir U Ahmed

(57) ABSTRACT

A geohydrology monitoring system is disclosed. In one example, the system includes a heating mechanism assembly including an array of heating elements disposed longitudinally within a fluid-containing environment so that portions of the heating mechanism assembly are at different positions lengthwise within the fluid-containing environment. The heating mechanism assembly is configured to impart energy to the fluid-containing environment such that heating provided at some locations varies from heating provided at other locations. The system includes a fiber optic distributed temperature sensor (DTS) disposed in proximity to the heating mechanism assembly and configured to sense temperature at a plurality of positions and at multiple times along the length of the fluid-containing environment. Based on output from the DTS, processing logic generates an output that indicates properties of, and movement of fluid within, the fluid-containing environment.

16 Claims, 4 Drawing Sheets

Figure 1. Geohydrology Monitoring System

Figure 2. Heaters Installed Between Conductors

Figure 3. Movement of Fluid Changes Distribution of Heat in vicinity of Locations with Increased Heating

MONITORING MOVEMENT IN FLUID-CONTAINING ENVIRONMENT VIA VARIABLE HEATING

CROSS REFERENCE TO RELATED APPLICATION

This application claims priority to U.S. Provisional Application No. 61/694,524, filed Aug. 29, 2012 and entitled MEASUREMENT OF SUB-SURFACE STRUCTURE AND WATER MOVEMENT, the entire contents of which are hereby incorporated herein by reference.

BACKGROUND

Understanding subsurface geohydrology is of value in many circumstances. Examples include resource extraction operations such as mining, and oil and gas drilling; managing aquifers and surface water resources; and environmental investigation and cleanup.

One method for studying subsurface geohydrology involves placing a device for measuring temperature down a well boring along with an electrical conductor that may be heated. By analyzing the temperatures attained during heating, as well as the decay of such heating when the heating is halted, information about the geological structure and groundwater may be inferred. For example, if groundwater is moving horizontally near the well, it draws heat from the area, cooling that area of the well. This method may use a fiber optic temperature sensor system, known as a "distributed temperature sensor" or DTS. The DTS offers the advantage of precise temperature measurement over long distances with sub-meter spatial resolution and sub-minute temporal resolution.

While this method is sensitive to variations in structure and water movement near the well, the ability to detect and measure vertical water movement is poor. This is because the heating is uniform with vertical position, so there little difference with elevation to indicate vertical water movement. Additionally, it can be difficult to discriminate between horizontal and vertical water movements as reasons for cooling. The current invention combines the advantages and capabilities of existing systems with a novel heating arrangement that allows detection of vertical water movement within and near a well.

DESCRIPTION

This description is directed to a geohydrology monitoring system having a heating mechanism assembly that can impart varying amounts of energy to provide variable heating at different positions along the elongated device, together with a fiber optic DTS. Examples of elongated hole or structure in which this could be utilized include bore holes and wells in the ground, as well as man-made structures such as pipes and shafts. Such structures may be vertically oriented, but may also be horizontal, curved, and in other orientations that may vary along the structure. Without loss of generality, for clarity we primarily refer to elongated structures as vertical structures herein since many wells and borings in the ground are predominantly vertical.

The varying heating power creates contrasting temperatures within the structure in the direction of elongation, for example vertically in a conventional vertically-oriented well. If there is movement of material parallel to the assembly, for example vertically in the case of a vertical well, either within or near the structure, that material movement transports heat, changing how temperatures vary along the length of the temperature sensor in the structure. By analyzing temperatures, information about vertical flow in or near the structure may be inferred. The material moving within or parallel to the structure may be water, oil, gas, or any other fluid that can transport heat with its movement. Without loss of generality, herein we primarily refer to water as the material that is transporting heat by its movement.

Figure 1:
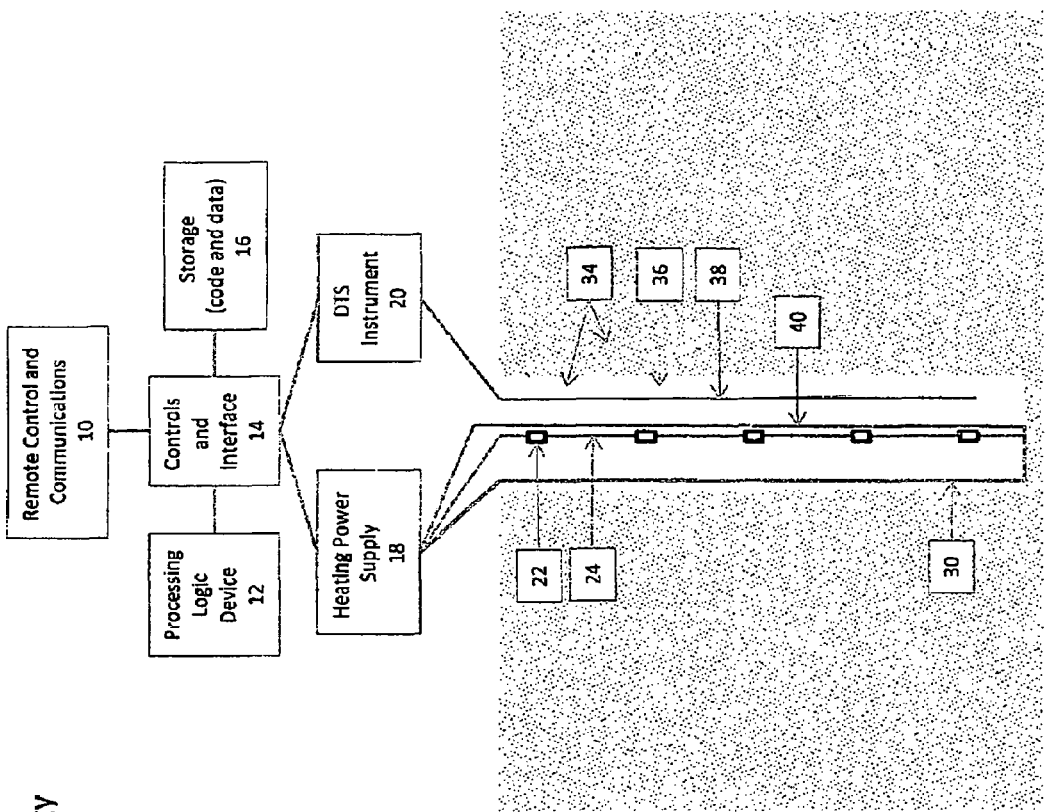
FIG. 1 schematically depicts an example of a geohydrology monitoring system according to the present description.

FIG. 1 shows an elongate hole, 36, in a fluid-containing environment, 34, with a cable incorporating an optical fiber, 38, that together with a distributed temperature sensor (DTS) instrument, 20, monitors temperature. The cable incorporating the optical fiber includes elements that protect the fiber and offer strength, density, and other mechanical properties desired for the application. When powered by a power supply, 18, an array of heating elements with alternating sections of lower, 24, and higher, 22, heating powers creates variable heating in the fluid-containing environment being monitored by the DTS. Heating power is controlled by controls, 14, which together with processing logic, 12, and storage, 16, allow for controlled operation of the heating mechanism, and storage and processing of data. The system may include remote control and communications capabilities, 10, that allow for remote control and data storage and processing. The heating power may be varied through time, for example being intermittently turned on and off in order to monitor rates of changes of temperature with the initiation or cessation of heating.

It may also be advantageous to include a uniform heating element, 40, in addition to the element with varying power. In one configuration a low resistance conductor, 30, may run to the bottom of the well, where it is connected with both the uniform and variable heating conductors that also run down the well. By controlling which of the two heating conductors is used to complete the circuit together with the low-resistance conductor, either uniform or varying power may be delivered within the well, or both may be energized simultaneously. The uniform heating may be superior for detecting fluid movement perpendicular to the elongate axis of the structure while the varying power may be superior for detecting fluid movement parallel to the elongate axis.

The variable power may be achieved in a variety of ways. One method is to use a uniform conductor, 24, but to deploy a greater length conductor in certain sections, 22, of the well. For example the conductor can run straight down the well where low power is desired, but be coiled, wrapped around, or gathered in loops in certain areas to deliver more power. A single layer of helical wrapping can readily provide 5 to 30 times the conductor per vertical distance of well, so if the conductor is heated uniformly it can deliver 5 to 30 times the power density in such areas. Larger concentrations of heating may be achieved with larger diameter coils or multiple layers. The added density of conductor may be achieved with multiple parallel passes of the conductor, as an alternative to helical coils or wrapping around other elements of the system.

Another method is to use an electrical conductor with differing resistance along its length. This may be achieved through use of differing conductor cross sections and differing materials. Such differing cross sections may be achieved through splicing of various conductors. Another method for achieving differing cross sections is to roll, compress, cut, or otherwise modify the conductor in sections, thereby increasing the resistance of those sections. This method may avoid the need for splices and may have advantages in ease of manufacturing.

Figure 2:
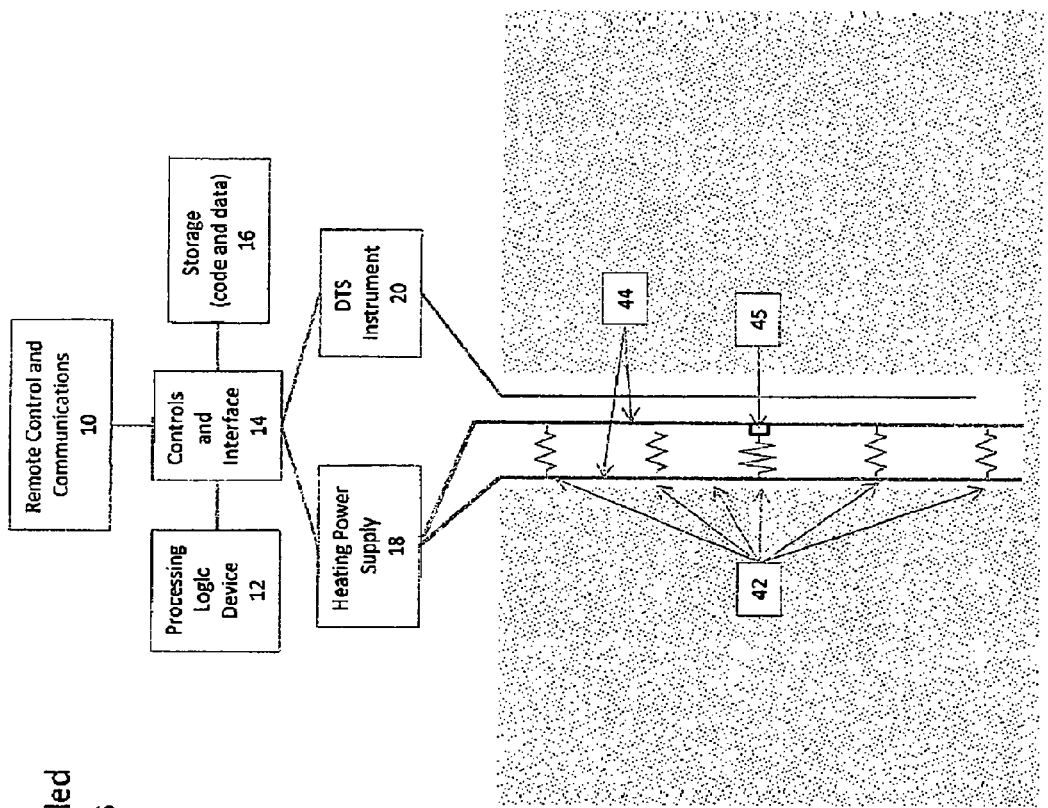
FIG. 2 schematically depicts another example of a heating mechanism assembly that can be employed with the system of FIG. 1.

Another method to achieve variable heating is to place two low-resistance conductors, FIG. 2, 44, in the well, with higher-resistance heating wires, 42, connected between those conductors where desired. Each of these heaters might be controlled independently, for example by being attached to the low-resistance conductors via a controlled switch, 45.

Other methods that achieve differing levels of power delivery along the length of the system may also be used, including methods that do not involve resistance heating of electrical conductors. In some cases, variable heating may be the result of native changes in the well, for example inflows of water or other liquids or gases, which created controlled or uncontrolled contrast in temperature with vertical position in the well.

Figure 3:
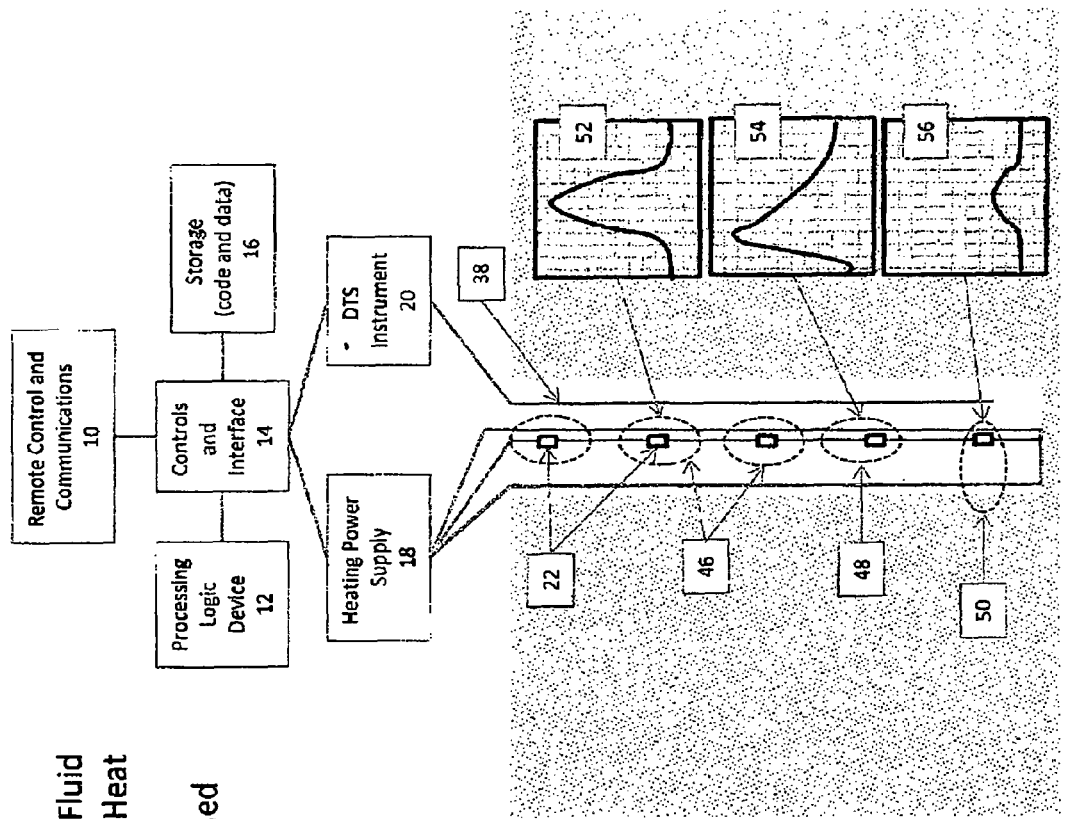
FIG. 3 depicts examples of how variable heating and sensed temperatures can be used to infer movement of material within a fluid-containing environment.

FIG. 3 shows areas of warming, 46, 48, 50, around sections of heating elements with higher power, 22. 48 shows an area in which an upward vertical flow of fluid occurring either within or near the well has shifted the warmed area upward relative to the location of heating. The schematic plot 52 shows temperature (y axis) versus distance along the temperature sensor (x axis), and shows a largely symmetric temperature distribution along the DTS cable, 38, in the vicinity of a higher power heating element in the absence of fluid movement. Schematic plot 54 shows asymmetry in the temperature distribution in the vicinity of such an element in the presence of vertical flow. 50 shows an area in which movement perpendicular to the elongated axis of the mechanism has shifted the warmed area to the left of the location of heating. The schematic plot 56 shows a symmetric but reduced temperature distribution relative to such an element without such motion, 52.

Varying the intensity of heating can create temperature variability along the structure, but selective chilling or refrigeration may also create the desired variability along a structure.

The temperature sensing system must have spatial resolution that is comparable to or finer than the spacing of the differences in heating power. Such fine resolution allows tracking the movement and dissipation of heat from individual higher-power heat locations. A fiber optic DTS typically offers special resolution of from about one tenth of a meter to about two meters. Depending on the DTS being used, this will determine the finest useful spacing of contrasting heating powers, with such spacing typically being equal to or greater than the spatial resolution of the DTS. Sensors for other parameters may supplement temperature data. For example, sensing pressure and flow rates at various locations in the structure being monitored may enhance the utility of the system.

The spacing of areas of increased power may be uniform or non-uniform along the system. For example, there may be particular depths of interest within a particular well, while other portions of the well are not expected to benefit from the analysis of heating that varies by depth. This allows concentrating power where it has the greatest expected benefit. Another reason to vary the spacing of higher power areas could be the variable spatial resolution of the temperature sensing system or varying velocities of water movements.

It may be useful in such systems to have the heating be intermittent in time, so that as well as monitoring steady-state temperatures achieved with heating, the increases in temperature after energizing the system and the decay in heating after de-energizing of heating may be analyzed. The changes and rates of changes of temperature as heat is initiated or halted may reveal useful information regarding the geohydrology in the vicinity of the system and well. There may also be value in energizing only portions of the system, for example every other area with higher heating power along the well.

A variety of methods in addition to electric heating described herein may be employed to create varying temperature within a structure, such as using heated or chilled fluid, chemical reactions, expanding or compressed gas, phase changes that absorb or release heat, or a wide variety of other configurations of electrical heating elements.

If the goal is to study movement of material near the well, but not within the well, then it may be advantageous to inhibit vertical motion of material within the well. Such motion may result from either vertical pressure differentials along the well, or convection due to temperature differences. Examples of methods for inhibiting such movement include filling the well with grout, mud, or other material that prevents or inhibits flow by increasing viscosity or creating resistance or obstacles to water movement in the well. A variety of materials may be added to the well to increase viscosity, with advantages to materials that are readily removed, non-toxic, or biodegradable. It may also require efforts to seal such material to cables, casing, or other structures within the well, in order to prevent vertical leakage. It may also be practical to inhibit such movement with periodic seals or barriers within the well.

In order to better understand the well and heating and sensing system, it may be advantageous to create known movement of material within the well. For example, a pipe may be installed within the well that allows pumping or extracting a known quantity of water to selected locations, creating vertical movement of water within the well. Analyzing how this created movement occurs or changes infiltration to the well may help understand the well, where it will be most productive, where to screen the well, and generally enhance the analysis of the system.

Methods for analyzing temperature measurements to infer information about wells or other structures, sometimes referred to as inversion algorithms, are expected to be useful with the current invention. Such algorithms may be devised for a wide variety of geometries, materials, and other parameters that affect the temperature response of elongated structures with or without movement of material transporting heat. Such algorithms may be stored digitally in executable code and implemented in a machine such as a computer. Such computer may be in communication with systems for controlling the heating or chilling equipment and/or the pumping of material into or out of the structure, as well as communicating with the DTS and other sensing systems. Such integration of controls, sensing, and algorithms may enhance the quantity and quality of useful information obtained through operation of the invention and related systems.

There may be value in designing a system utilizing this invention to be portable, so that it may be brought to remote locations for investigations. There may be value in providing the system with the capability to remotely control and access collected data.

Figure 4:
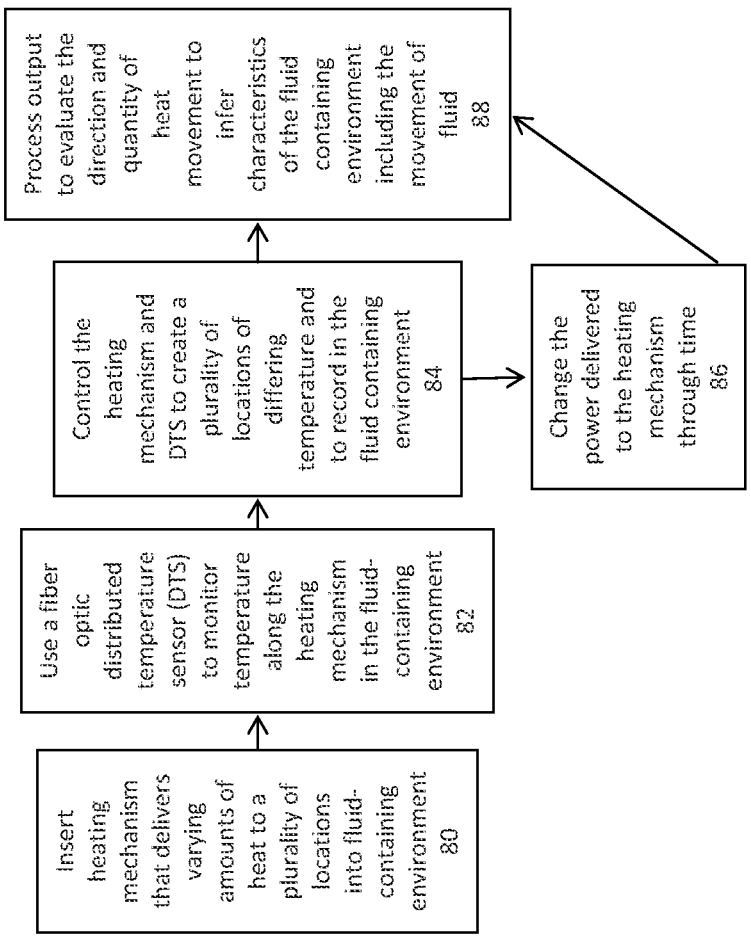
FIG. 4 depicts an exemplary method for monitoring the geohydrology of a fluid containing environment.

FIG. 4 shows a method for using a geohydrology monitoring system to ascertain properties of a fluid-containing environment and to evaluate movement of fluid within that environment. A heating mechanism that imparts greater heat to a plurality of locations than to a plurality of other locations is inserted into a fluid containing environment (80). A fiber optic distributed temperature sensor is used in proximity to the heating mechanism within the fluid containing environment (82). The heating mechanism and temperature sensor are controlled to create temperatures that vary in time and by location within the fluid containing environment, and records temperatures that result from such controls (84, 86). The output of the temperature sensor, together with the record of operation of the heating mechanism, is processed to evaluate heat flows and properties, including fluid movement, of the fluid containing environment (88).

The methods and processes described above may be implemented in a computing system having various components. The computing system and parts thereof may take the form of one or more personal computers, server computers, mobile computing devices, and the like.

The implemented computing system(s) will include a logic subsystem (e.g., processing logic 12) and a storage subsystem for holding code, data, etc. (e.g., storage 16). The computing system(s) may optionally include a display subsystem, input subsystem, communication subsystem, and/or other components.

The processing logic 12 may include one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem/processing logic may include one or more processors configured to execute software instructions (e.g., instructions configured to estimate fluid movement based on sensed temperature). Additionally or alternatively, the logic may include one or more hardware or firmware logic machines configured to execute hardware or firmware instructions. Processors may be single-core or multi-core, and the instructions executed thereon may be configured for sequential, parallel, and/or distributed processing. Individual components optionally may be distributed among two or more separate devices, which may be remotely located and/or configured for coordinated processing. Aspects of the logic may be virtualized and executed by remotely accessible, networked computing devices configured in a cloud-computing configuration.

Storage subsystem 16 may include one or more physical devices configured to hold instructions executable by the processing logic to implement the methods and processes described herein. When such methods and processes are implemented, the state of the storage devices may be transformed—e.g., to hold different data.

The storage subsystem may include removable and/or built-in devices. Storage components may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The storage subsystem may include volatile, nonvolatile, dynamic, static, read/write, read-only, random-access, sequential-access, location-addressable, file-addressable, and/or content-addressable devices.

A display subsystem may be used to present a visual representation of data held by the storage subsystem. This visual representation may take the form of a graphical user interface (GUI). As the herein described methods and processes change the data held by the storage machine, and thus transform the state of the storage machine, the state of the display subsystem may likewise be transformed to visually represent changes in the underlying data. The display subsystem may include one or more display devices utilizing virtually any type of technology. Such display devices may be combined with processing and storage components in a shared enclosure, or such display devices may be peripheral display devices.

When included, an input subsystem may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, a communication subsystem may be configured to communicatively couple the implemented computing system(s) with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow the computing system to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A geohydrology monitoring system, comprising:
   a heating mechanism assembly including an array of heating elements with an alternating sections of lower and higher heating elements disposed longitudinally within a fluid-containing environment so that portions of the heating mechanism assembly are at different positions lengthwise within the fluid-containing environment, the heating mechanism assembly being configured to impart energy to the fluid-containing environment with energy delivered to the heating mechanism; such that heating provided at some locations varies from heating provided at other locations;

a fiber optic distributed temperature sensor disposed in proximity to co-located with the heating mechanism assembly and configured to sense temperature at a plurality of positions and at multiple times along the length of the fluid-containing environment; and processing logic device with data storage subsystem having a communication link to the distributed temperature sensor to receive data from the distributed temperature senor and configured to process data from the distributed temperature sensor using an inversion algorithm to generate an output indicating movement of fluid in the fluid-containing environment.

2. The geohydrology monitoring system of claim 1, wherein the output indicates a velocity of fluid movement parallel to a longitudinal orientation of the geohydrology monitoring system.

3. The geohydrology monitoring system of claim 1, wherein the output indicates a velocity of fluid movement perpendicular to a longitudinal orientation of the geohydrology monitoring system.

4. The system of claim 1, wherein the heating mechanism assembly is operable in an alternate mode in which it provides lengthwise uniform heating to the fluid-containing environment.

5. The geohydrology monitoring system of claim 1, wherein the heating mechanism assembly is configured to vary, over time, the heating provided to the fluid-containing environment, and wherein the processing logic device uses an inversion algorithm to process sensed temperatures produced by such variable heating to generate one or more additional outputs that characterize one or both of (a) movement of fluid in the fluid-containing environment, and (b) a property of the fluid-containing environment.

6. The geohydrology monitoring system of claim 1, wherein the output developed with use of the inversion algorithm indicates movement of fluid at multiple different locations in the fluid-containing environment.

7. The geohydrology monitoring system of claim 1, wherein the heating mechanism is installed in an elongate hole.

8. The geohydrology monitoring system of claim 1, wherein the heating mechanism assembly includes electrical components along its length with varying resistance so as to provide the variable heating.

9. The geohydrology monitoring system of claim 1, wherein the heating elements are controllable to provide selective heating of locations within the fluid-containing environment.

10. The geohydrology monitoring system of claim 1, wherein heating is provided for an interval of time and then halted, with the processing logic device using the inversion algorithm to being configured to estimate a rate of migration through time of temperature gradients resulting from varying heating by location, thereby providing an estimate of a velocity of fluid movement parallel to the longitudinal axis of The geohydrology monitoring system.

11. The geohydrology monitoring system of claim 1, wherein the communication link is implemented with at least one or more of a wireless connection, a wire connection, or a removable data storage device that connects with a port on the sensor and a port on the data storage subsystem, thereby enabling data transfer.

12. A method of monitoring geohydrology of a fluid-containing environment, comprising:

inserting a heating mechanism assembly into the fluid-containing environment to heat a plurality of locations with alternating sections of lower and higher heating elements disposed longitudinally within the fluid-containing environment; delivering energy to the heating mechanism;

controlling the heating mechanism assembly such that heat imparted to some locations is greater than heat imparted to other locations in the fluid containing environment;

using a fiber optic distributed temperature sensor, monitoring temperature at a plurality of locations co-located with the heating mechanism assembly;

based on output from the fiber optic distributed temperature sense, sensor, use an inversion algorithm to evaluate the evaluating direction and quantity of heat movement within the fluid containing environment; and based on evaluation of direction and quantity of heat movement, estimating properties of the fluid containing environment including fluid movement in the vicinity of the heating mechanism assembly.

13. The method of claim 12, further comprising:

controlling the heating mechanism assembly to provide time-varying heating at one or more locations in the fluid-containing environment;

with the fiber optic distributed temperature sensor, measuring rates of heating and cooling in the fluid containing environment; and based on the measured rates of heating and cooling, estimating properties of the fluid containing environment including fluid movement in the vicinity of the heating mechanism assembly.

14. The method of claim 12, wherein the heating mechanism is installed in an elongate hole.

15. The method of claim 14, further comprising evaluating one or more of location, velocity and quantity of fluids flowing into and out of the elongate hole.

16. The method of claim 14, further comprising evaluating one or more of location, velocity and quantity of fluids flowing within the elongate hole.

* * * * *